(12) United States Patent
Kim et al.

(10) Patent No.: US 8,837,851 B2
(45) Date of Patent: Sep. 16, 2014

(54) METHOD OF MEDIAN FILTERING

(75) Inventors: Myung Hoon Kim, Incheon (KR); Nam Young Kong, Seongnam-si (KR)

(73) Assignee: LG Display Co., Ltd., Seoul (KR)

( * ) Notice: Subject to any disclaimer, the term of this patent is extended or adjusted under 35 U.S.C. 154(b) by 1069 days.

(21) Appl. No.: 11/449,235

(22) Filed: Jun. 8, 2006

(65) Prior Publication Data

US 2006/0291740 A1     Dec. 28, 2006

(30) Foreign Application Priority Data

Jun. 28, 2005  (KR) .................. 10-2005-0056530

(51) Int. Cl.
  G06K 9/40       (2006.01)
  H04N 9/64       (2006.01)
  G06T 5/00       (2006.01)
  G06T 5/20       (2006.01)

(52) U.S. Cl.
  CPC ....... *G06T 5/002* (2013.01); *G06T 2207/20032* (2013.01); *G06T 2207/10024* (2013.01); *G06T 5/20* (2013.01)
  USPC .......................................... 382/262; 348/246

(58) Field of Classification Search
  USPC .......................................... 382/262; 348/246
  See application file for complete search history.

(56) References Cited

U.S. PATENT DOCUMENTS

| | | | | |
|---|---|---|---|---|
| 4,782,389 A | * | 11/1988 | Mayweather, III | 348/616 |
| 5,446,501 A | * | 8/1995 | Takemoto et al. | 348/620 |
| 6,028,628 A | * | 2/2000 | Van Der Valk | 348/246 |
| 6,208,764 B1 | * | 3/2001 | Archer et al. | 382/260 |
| 6,360,025 B1 | * | 3/2002 | Florent | 382/261 |
| 6,965,395 B1 | * | 11/2005 | Neter | 348/129 |
| 7,046,304 B2 | * | 5/2006 | Amano | 348/607 |
| 2004/0071363 A1 | * | 4/2004 | Kouri et al. | 382/276 |

FOREIGN PATENT DOCUMENTS

| | | |
|---|---|---|
| JP | 11-265447 | 9/1999 |
| JP | 2001-143068 | 5/2001 |
| JP | 2003-283876 | 10/2003 |
| JP | 2004-048562 | 2/2004 |

OTHER PUBLICATIONS

Office Action issued in corresponding Japanese Application No. 2006-150377; mailed Mar. 24, 2009.

\* cited by examiner

*Primary Examiner* — Kim Vu
*Assistant Examiner* — Fred Hu
(74) *Attorney, Agent, or Firm* — Brinks Gilson & Lione

(57) ABSTRACT

A median filtering method makes a plurality of pixel data into a block of fixed unit area which includes a central pixel and a plurality of ambient pixels adjacent to the central pixel. Pixel data within the unit area is divided into sub unit areas which are smaller than the unit area. The data value of the divided pixel data is arranged in a fixed order for each of the sub unit areas. An intermediate value is determined from the arranged pixel data in each of the sub unit areas. An average value of the intermediate values which are extracted from each of the sub unit areas, and the central pixel data is determined corresponding to the central pixel of the unit area with the average value.

12 Claims, 13 Drawing Sheets

| 10 | 30 | 5 |
|----|----|----|
| 20 | 200 | 20 |
| 15 | 10 | 30 |

5  10  10  15 (20) 20  30  30  200
↑
Median

| 10 | 30 | 5 |
|----|----|----|
| 20 | 20 | 20 |
| 15 | 10 | 30 |

FIG. 4
RELATED ART
EXAMPLE OF GENERATION OF DIGITAL NOISE
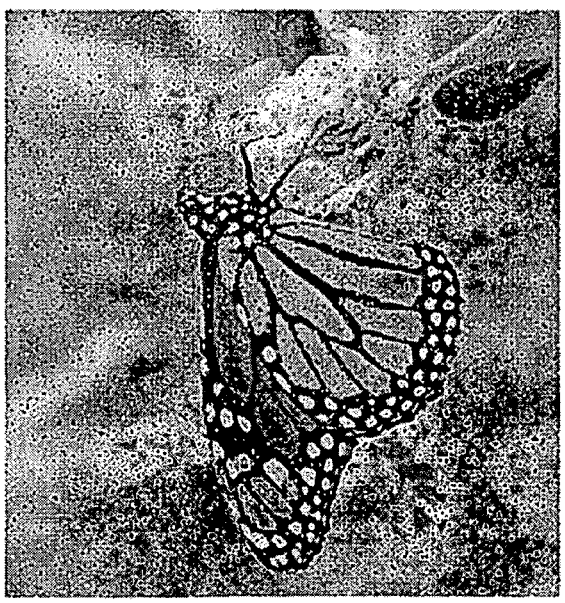
AFTER USING MEDIAN FILTE

METHOD OF MEDIAN FILTERING This application claims the benefit of priority to Korean Patent Application No. P2005-0056530 filed on Jun. 28, 2005, herein incorporated by reference.

BACKGROUND

1. Technical Field

The technical field relates to median filtering, and more particularly to a median filtering method that is adaptive for realizing vivid and clear picture quality by distinguishing digital noise in video data and replacing the digital noise by use of a median filter.

2. Description of the Related Art

Digital noise greatly deteriorates visual picture quality in producing a display. In order to improve this, a median filter extracts an intermediate value among gray level values within a fixed area and replaces the digital noise with the intermediate value, thereby replacing the digital noise.

As shown in FIG. 1, a median filter of the related art has each pixel arranged in a block of fixed unit area. As shown in FIG. 2, the gray level value of each pixel is arranged in an ascending order or descending order within the unit area block, and an intermediate value is selected. As shown in FIG. 3, the data of a central pixel within the unit area is replaced with the intermediate value. If a similar median filter is used, as is shown in FIG. 4, the digital noise is removed and the deterioration of picture quality can be prevented. In the case of a still image or text image where all the central pixel data are replaced with another value through the median filter the result is that the picture quality of an image using the median filter is more deteriorated than the existing image. Furthermore, because the gray level values of all the pixels located within the unit area should be arranged and the intermediate value should be extracted, there is a problem in that the capacity of the filter can be large, as arranging the gray values and extracting the intermediate value can take a long time and calculating the replacement value is complicated.

SUMMARY

A median filtering method is disclosed that is adaptive for realizing vivid and clear picture quality by distinguishing digital noise in video data and replacing the digital noise by use of a median filter.

A median filtering method includes making a plurality of pixel data into a block of fixed unit area which includes a central pixel and a plurality of ambient pixels adjacent to the central pixel and dividing the plurality of pixel data within the unit area into sub unit areas which are smaller than the unit area. The data value of the divided pixel data is arranged in a fixed order for each of the sub unit areas and extracting an intermediate value from the arranged pixel data in each of the subunit areas. An average value is calculated of the intermediate values which are extracted from each of the sub unit areas and replacing the central pixel data corresponding to the central pixel of the unit area with the average value.

BRIEF DESCRIPTION OF THE DRAWINGS

The disclosure includes the following detailed description and reference to the accompanying drawings, in which:

FIG. 4 is a view of an effect according to the median filter of the related art.

DETAILED DESCRIPTION

Reference will now be made in detail to the examples, which are illustrated in the accompanying drawings. Wherever possible, the same reference numbers will be used throughout the drawings to refer to the same or like parts.

Figures 1, 2, 3:
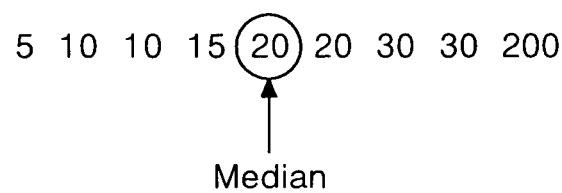
FIGS. 1 to 3 are a median filter of the related art.
Figure 5:
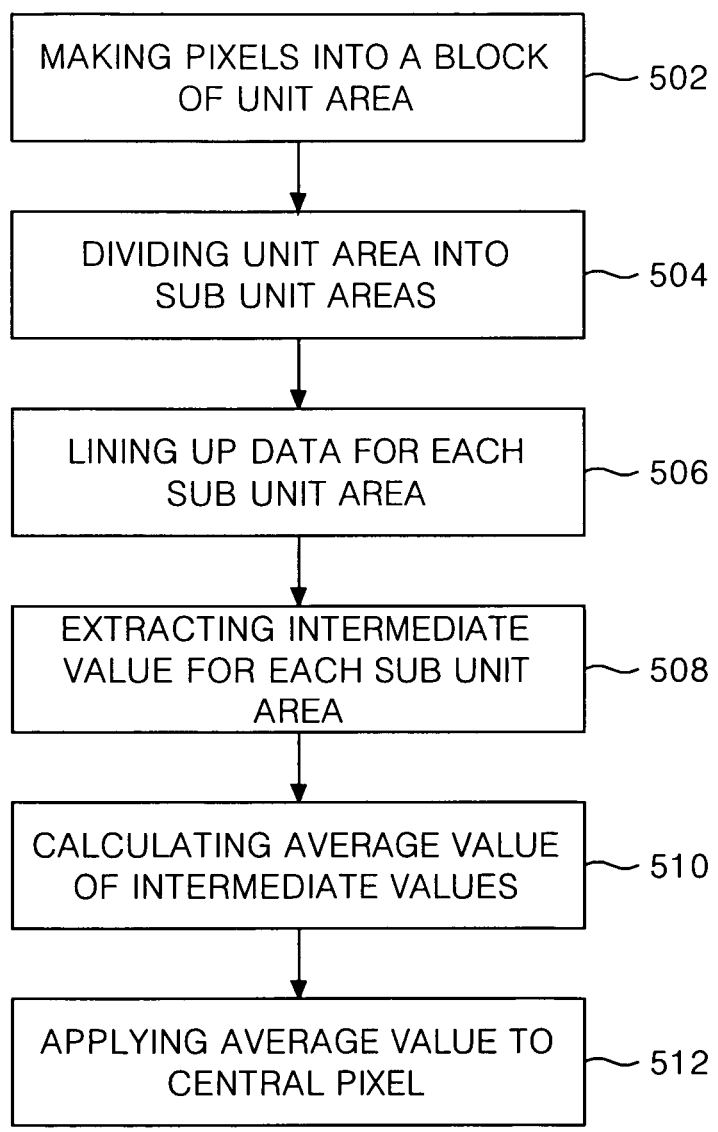
FIG. 5 is a view representing an example of a method that applies a median filter.

Referring first to FIG. 5, a median filter makes a plurality of pixel data into a block of fixed unit area (Act 502), and the pixel data within the unit area are divided into sub unit areas (Act 504). The pixel data located within the sub unit area are arranged in an ascending order or descending order for each sub unit area (Act 506), and an intermediate value is extracted (Act 508). A calculated value, such as the average value, median value, mode, skew, kurtosis, or other statistical value of the extracted intermediate values is calculated (Act 510), and the data of a central pixel is replaced with the calculated value to be applied (Act 512). The calculated value, such as the average value is rounded off to the first decimal place. Since it is unnecessary to arrange all the pixel data within the unit area, it takes a short time to arrange and calculation becomes simpler. Methods of dividing the pixels of the unit area into the sub unit areas in Act 504 are shown in FIGS. 6 to 8.

Figure 6:
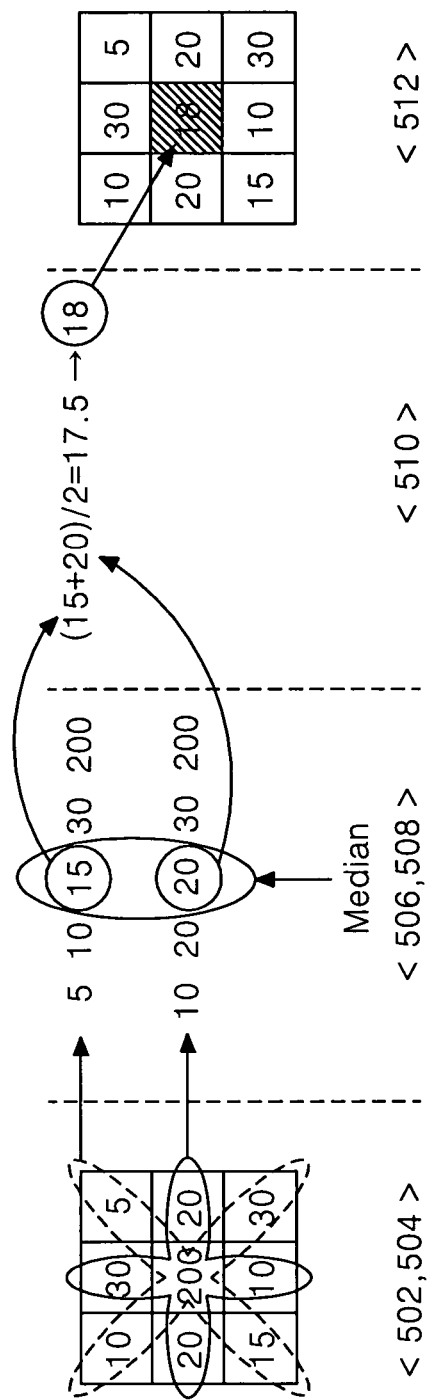
FIG. 6 is a view of a method of dividing a sub unit area in FIG. 5.

Referring to FIG. 6, the unit area is made into a block such as a block of 3×3, 5×5, or m×m (where m is a natural odd number greater than 1) (Act 502), the pixel data within the unit area are bisected into the sub unit areas of a cross direction and diagonal directions on the basis of the central pixel data (Act 504). The pixel data within the sub unit area of the cross direction and the sub unit area of the diagonal directions are each arranged (Act 506), and the intermediate value is extracted (Act 508). The calculated value, such as the average value, of the extracted two intermediate values are calculated (Act 510), and the central pixel data is replaced with the value generated by rounding off to the first decimal place, i.e., 18, to be applied (Act 512).

Figure 7:
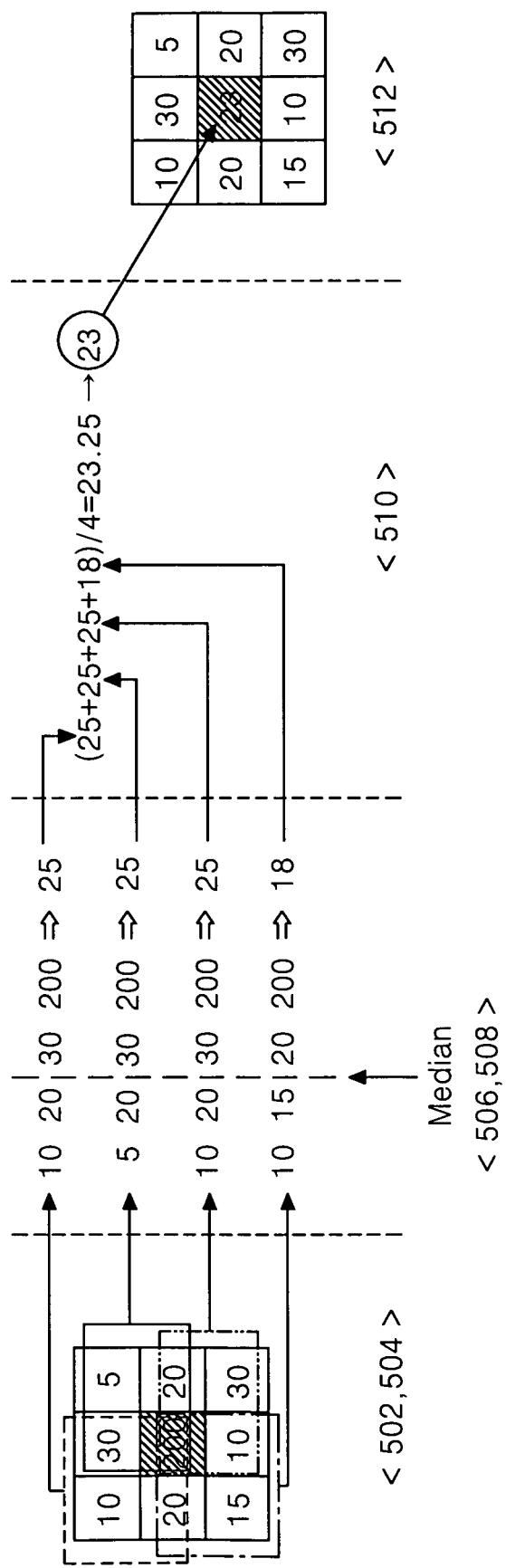
FIG. 7 is a view of an alternative method of dividing a sub unit area in FIG. 5.

Referring to FIG. 7, the unit area is made into a block of 3×3 (Act 502), the pixel data within the unit area are divided into the four sub unit areas on the basis of the central pixel data (Act 504). The pixel data within each of the four sub unit areas are arranged (Act 506), and the intermediate value is extracted (Act 508). At this moment, the number of the data within the sub unit area is an even number, thus the calculated value, such as the average value, of the two middle-positioned data is calculated to round off to the first decimal place so as to be extracted as the intermediate value and the average value of the extracted four intermediate values is calculated (Act 510), and the central pixel data is replaced with the value generated by rounding off to the first decimal place, i.e., 23, to be applied (Act 512).

Figure 8:
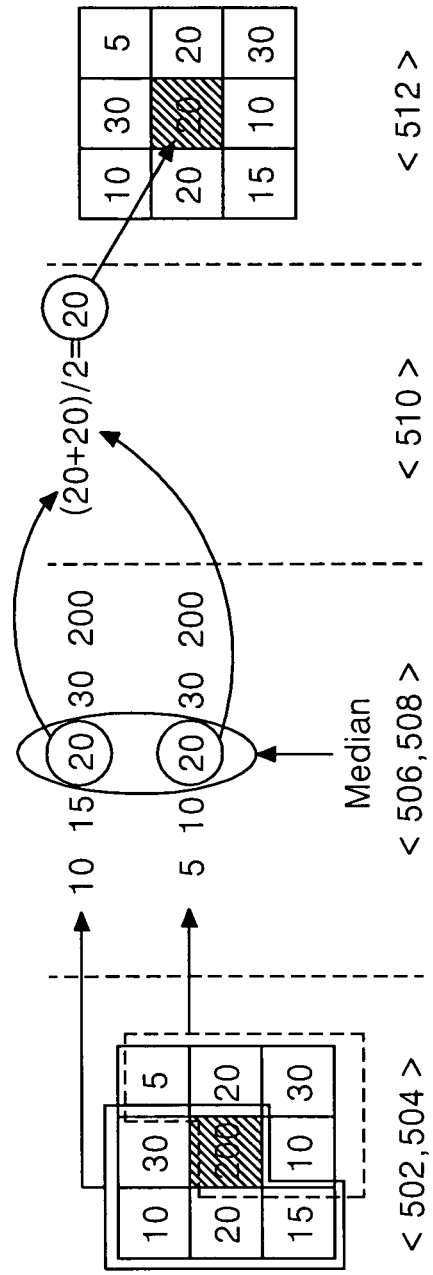
FIG. 8 is a view of a further alternative method of dividing a sub unit area in FIG. 5.

Referring to FIG. 8, the unit area is made into a block, such as a block of 3×3, 5×5, or m×m (where m is a natural odd number greater than 1) (Act 502), the pixel data within the unit area are divided into two sub unit areas on the left and right sides on the basis of the central pixel data (Act 504). At this moment, the division can be made on the left and right sides or the upper and lower sides on the basis of the central pixel data. The pixel data of the bisected sub unit area are each arranged (Act 506), and the intermediate value is extracted (Act 508). The average value of the extracted two intermediate values are calculated (Act 510), and the central pixel data is replaced with the calculated average value, i.e., 20, to be applied (Act 512).

Figure 9:
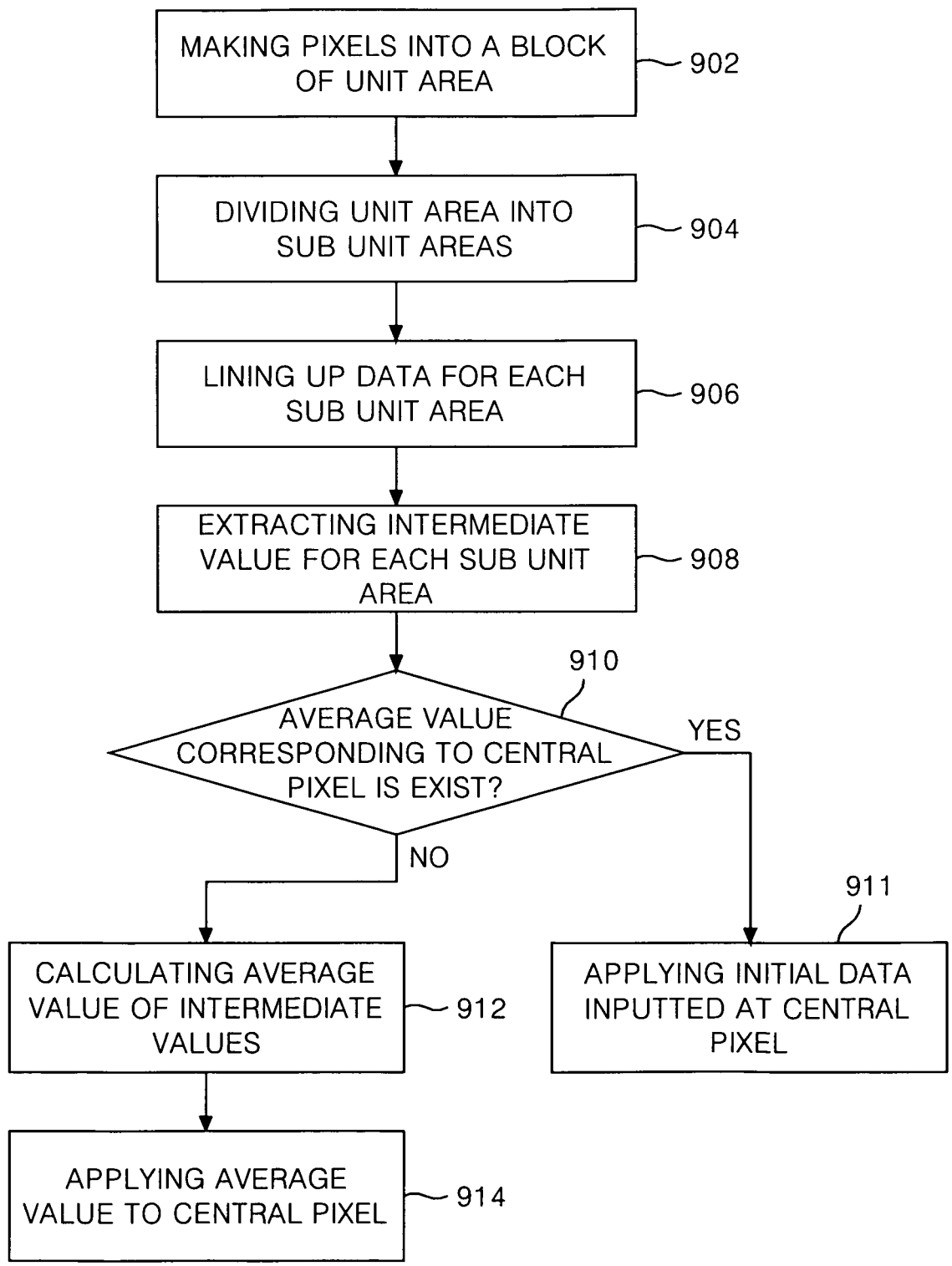
FIG. 9 is a view of an example of a method for applying a median filter.

Referring to FIG. 9, a median filter has a plurality of pixel data made into a block of fixed unit area (Act 902), and the pixel data within the unit area are divided into sub unit areas (Act 904). The pixel data located within the sub unit area are arranged in an ascending order or descending order for each sub unit area (Act 906), and an intermediate value is extracted (Act 908). The extracted intermediate values are compared with the central pixel data of video data (Act 910), and if there is a coincidence between them, the existing central pixel data is not changed and applied intact (Act 911). In case of there being no identical value, a calculated value, such as the average value, median value, mode, skew, kurtosis, or other statistical value, of the extracted intermediate value is calculated (Act 912), and the data of a central pixel is replaced with the calculated average to be applied (Act 914). The average value may be rounded off to the first decimal place. Methods of dividing the pixels of the unit area into the sub unit areas in Act 904 are the same as the Act 504 explained in FIGS. 6 to 8.

Figure 10:
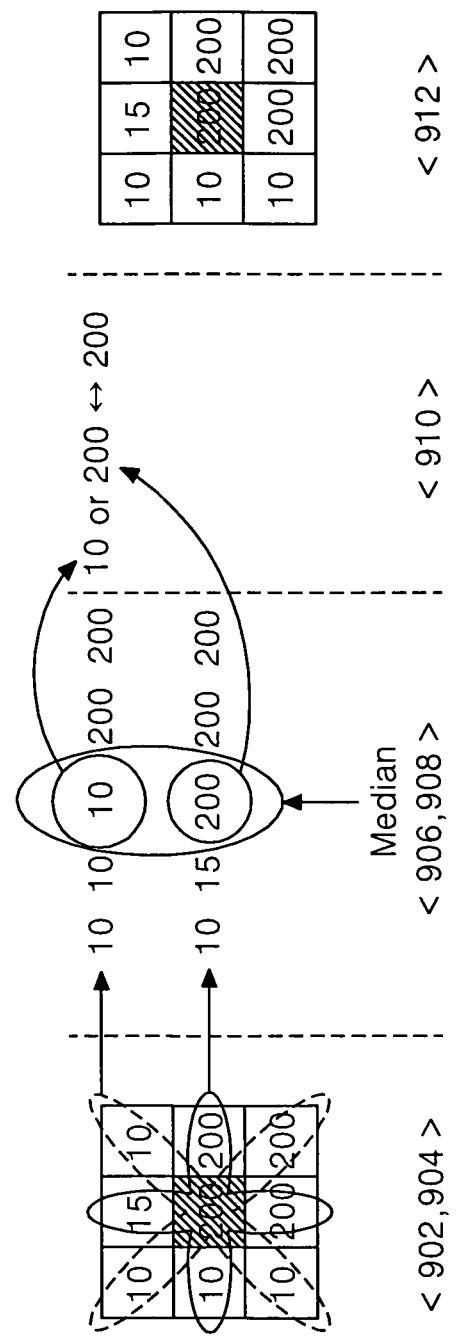
FIG. 10 is a view of acts Act 902 to 911 of FIG. 9.

FIG. 10 is a view of Act 902 to 911 of FIG. 9. Referring to FIG. 10, the unit area is made into a block, such as a block of 3×3, 5×5, or m×m (where m is a natural odd number greater than 1) (Act 902), the pixel data within the unit area are bisected by the method of FIG. 6 (Act 904). The pixel data within the bisected sub unit area are each arranged (Act 906), and the intermediate value is extracted (Act 908). When comparing the extracted two intermediate values with the existing central pixel data (Act 910), because the existing value '200' is the same as the intermediate value '200' of the crossing direction, the existing value is applied intact (Act 911).

In case of converting the data of all the pixels by the method shown in FIG. 5, the normal video data is changed to generate a problem in a display image, but because the method shown in FIG. 9 is applied, it is possible to prevent the problem that the data, not the digital noise, is changed.

Figure 11:
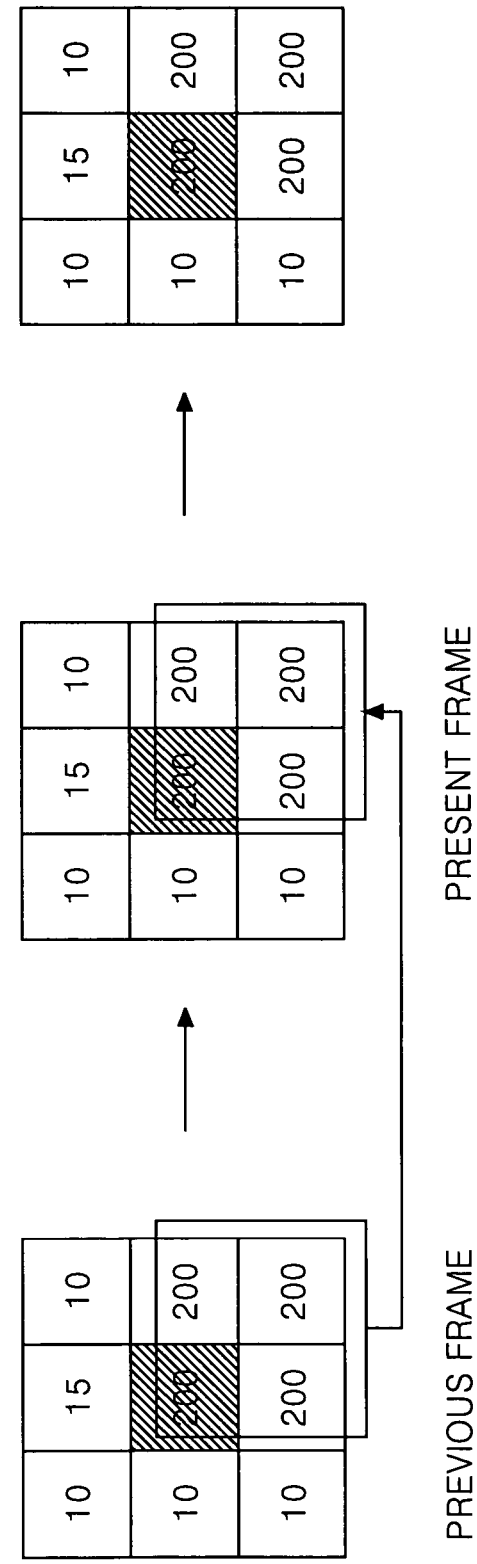
FIG. 11 is a view of an example of a method for applying a median filter.

Referring to FIG. 11, after making pixel data into a block of fixed unit area, if adjacent 4 or more pixel data is the same in a previous frame and the pixel data have the same gray level values in a present frame as in the previous frame, the pixel data are judged as normal data to be utilized without change. Where there is no identical data, similar processes as Acts 502 to Act 512 of the method shown in FIG. 5 are applied. In the method depicted by FIG. 11, it is possible to prevent data such as a still image, a text image, etc. from being recognized as the digital noise to be changed into new data even though that data represents normal data.

Hereinafter, a median filtering device for implementing the above-mentioned method for applying a median filter will be described with reference to FIG. 12 to FIG. 15.

Figure 12:
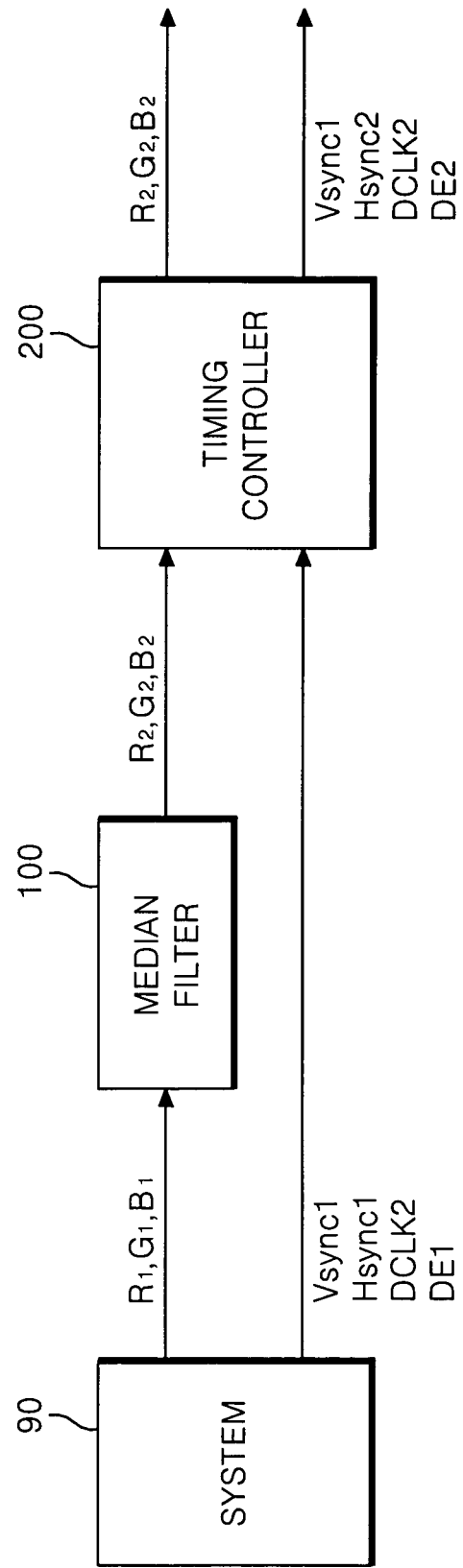
FIG. 12 is a block view showing a median filtering device for implementing a median filtering of the present invention.

Referring to FIG. 12, the median filtering device includes a median filter 100 for filtering a first data $R_1G_1B_1$ from a system 90 and a timing controller 200 for controlling a display panel in which a picture is implemented by a second data $R_2G_2B_2$ filtered from the median filter 100.

Figure 13:
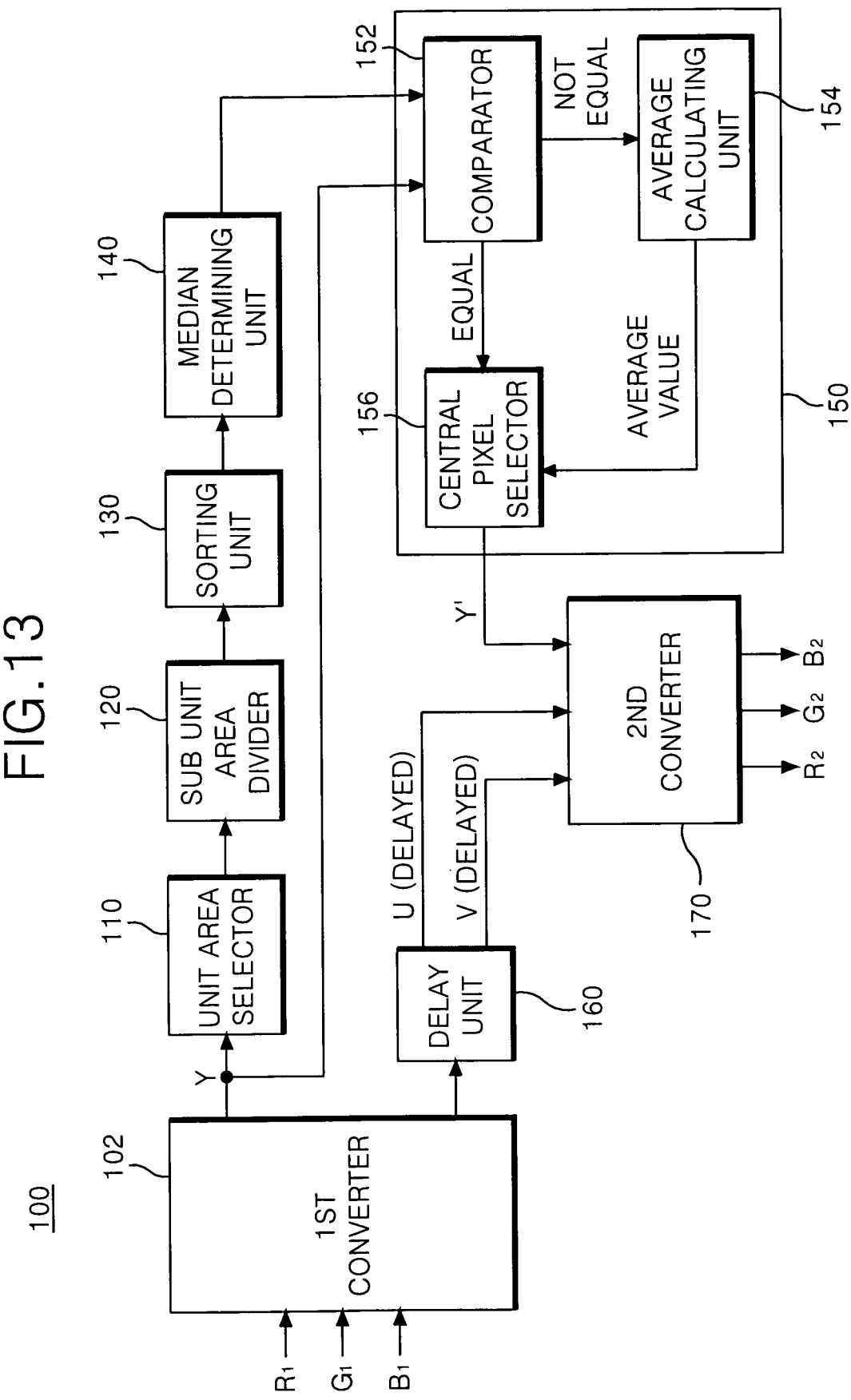
FIG. 13 is a block view showing the median filter in FIG. 12.

As shown in FIG. 13, the median filter 100 includes a first converter 102, a unit area selector 110, a sub unit area selector 120, a sorting unit 130, a median determining unit 140, a central pixel data determining unit 150, a delay unit 160 and a second converter 170.

The first converter 105 divides the first data R1G1B1 into brightness components Y and chrominance components UV. For example, each brightness components Y and chrominance components UV are defined by the following equation (1) to equation (3).

$$Y=0.229*R_1+0.587*G_1+0.114*B_1 \qquad (1)$$

$$U=0.493*(B_1-Y) \qquad (2)$$

$$V=0.887*(R_1-Y) \qquad (3)$$

The unit area selector 110 divides brightness components Y into a gray scale level of a frame unit and defines a plurality of pixel data into a constant unit area.

The sub unit area selector 120 divides the pixel data within the unit area into the sub unit area.

Figure 14:
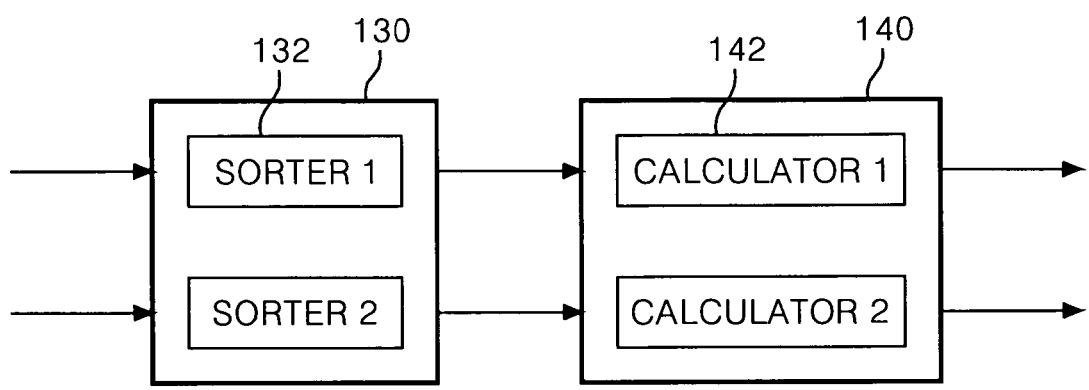
FIG. 14 is a block view showing a configuration of each sorting unit and median calculating unit.
Figure 15:
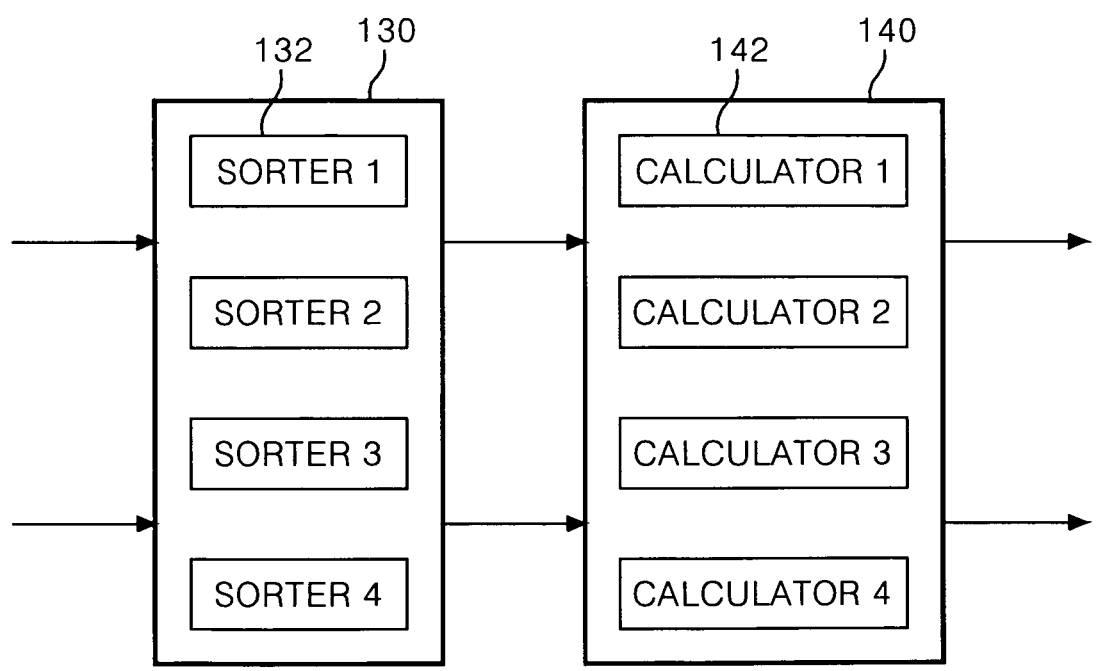
FIG. 15 is a block view showing another configuration type of each sorting unit and median calculating unit.

The sorting unit 130 arranges the pixel data of within each sub unit area using a constant rule, and the median determining unit 140 extracts or calculates an intermediate value of the data sorted by the constant rule. The sorting unit 130 and median determining unit 140 each include a sorter 132 and calculator 142 corresponding to the number of sub unit areas resulting from dividing the unit area. For example, referring to FIG. 6 and FIG. 8, if the unit area is divided into 2 sub unit areas, the sorting unit 130 includes a sorter 132 for each sub unit area, and the median determining unit 140 includes a calculator 142 for each sub unit area, as shown in FIG. 14. Similarly, referring to FIG. 7 in conjunction with FIG. 15, if the unit area is divided into 4 sub unit areas, the sorting unit 130 includes a sorter 132 for each sub unit area and the median determining unit 140 includes a calculator 142 for each sub unit area, as shown in FIG. 15.

The central pixel data determining unit 150 includes a comparator 152, an average calculating unit and a central pixel selector 156.

The comparator 152 compares an intermediate value extracted or calculated from the median determining unit 140 with a central pixel data of a motion picture data.

If the comparator 152 determines that the intermediate value equals the central pixel data of the motion picture data, the central pixel selector 156 adopts a value without converting a central pixel data.

Conversely, if the comparator 152 determines that the intermediate value does not equal the central pixel data of the motion picture data, the average value calculating unit 154 calculates an average value of the intermediate value extracted or calculated from the median determining unit 140 and conveys the calculated average value to the central pixel selector 156. In this case, the central pixel selector 156 replaces a data of the central pixel with an average value from the average value calculator 154.

The delay unit 160 delays chrominance components UV until the central data among the pixel data corresponding to brightness components Y separated from the first converter 105 is filtered, and supplies the delayed chrominance components UV to the second converter 170 in order to synchronize with the filtered brightness components Y'.

The second converter 156 forms the second data $R_2G_2B_2$ by using chrominance components UV delayed by the delay unit 160 and brightness components Y' filtered from the central pixel data determining unit 150, and supplies the second data $R_2G_2B_2$ to the timing controller 200.

For example, the second data $R_2G_2B_2$ are defined by the following equation (4) to equation (6).

$$R_2 = Y + 0.000*U + 1.140*V \quad (4)$$

$$G_2 = Y - 0.000*U - 0.581*V \quad (5)$$

$$B_2 = Y + 2.029*U + 0.000*V \quad (6)$$

The timing controller 200 supplies the second data $R_2G_2B_2$ to a driver for driving the display panel.

Referring back to FIG. 12, The timing controller 200 is supplied with a first vertical/horizontal synchronized signal Vsync1 and Hsync1, a first clock signal DCLK1 and a first data enable signal DE1. The timing controller 200 generates a second vertical/horizontal Vsync2 and Hsync2, a second clock signal DCLK1 and a second data enable signal DE1 in order to synchronize with the second data R2G2B2. In one example, the median filter 100 may be contained in the timing controller 200.

The method of applying median filter shown in the previous examples is performed by the median filtering device as disclosed herein.

As described above, the median filtering method isolates the digital noise in the video data and applies the median filter which simplifies calculation. Thus, the digital noise is effectively replaced to allow for a vivid and clear picture quality.

Although the present invention has been explained by the examples shown in the drawings described above, it should be understood to the ordinary skilled person in the art that the method is not limited to the disclosed examples, but rather that various changes or modifications thereof are possible. Accordingly, the scope of the disclosure shall be determined only by the appended claims and their equivalents.

What is claimed is:

1. A median filtering device operable to perform a median filtering method, the method comprising:
    forming a unit area which includes a central pixel and a plurality of ambient pixels arranged to be adjacent to the central pixel, wherein the unit area is a block such as m*m (where m is a natural odd number greater than 1);
    dividing the unit area into a plurality of sub-unit areas which are smaller than the unit area, each sub-unit area corresponding to a pixel and having a pixel data value;
    selecting a first pixel group including the central pixel and a part of the ambient pixels, wherein the first pixel group is the pixels selected of a cross direction including a horizontal direction and a vertical direction on the central pixel;
    selecting a second pixel group including the central pixel and a remaining part of the ambient pixels that are not selected in the first pixel group,
    wherein the second pixel group is the pixels selected of diagonal directions including a left diagonal direction and a right diagonal direction on the central pixel;
    extracting a first intermediate value from pixel data values of the first pixel group, wherein the first intermediate value is a middle-sized value of all the pixels data values of the first pixel group;
    extracting a second intermediate value from the pixel data values of the second pixel group, wherein the second intermediate value is a middle-sized value of all the pixels data values of the second pixel group;
    calculating an average value based on the first intermediate value and the second intermediate value;
    determining a central pixel data value by comparing the first and the second intermediate values with a current central pixel data value, and if a coincidence between at least one of the first intermediate value and the second intermediate value and the current central pixel data value exists,
    maintain the current central pixel data value, and if no coincidence exists, replacing the current central pixel data value with the average value.

2. A median filtering method according to claim 1, wherein determining the central pixel data comprises utilizing the central pixel data if the central pixel data is equal to the second intermediate value.

3. The median filtering method according to claim 2, further comprising dividing the unit area into two sub unit areas in a cross direction and a diagonal direction based on the central pixel of the unit area.

4. The median filtering method according to claim 2, further comprising dividing the unit area into four sub unit areas inclusive of the central pixel based on the central pixel of the unit area.

5. The median filtering method according to claim 2, further comprising dividing the unit area into two sub unit areas inclusive of the central pixel based on the central pixel of the unit area.

6. The median filtering method according to claim 1, where a number of the pixel data located within each of a plurality of sub unit areas is an even number and the pixel data within each of the sub unit areas are arranged in at least one of a descending or an ascending order, further comprising determining an intermediate value extracted in each of the sub unit areas by averaging two data located in a middle of the at least one of the descending or ascending ordered data.

7. The median filtering method according to claim 2, further comprising:
    utilizing the central pixel data input to the central pixel of the unit area where the adjacent four or more pixels which have the same gray levels in a previous frame of the unit area have the same gray level values and are similarly located as in a present frame.

8. The median filtering method according to claim 1, further comprising arranging the pixel data values in the first pixel group in an ascending order for each of the sub-unit areas.

9. The median filtering method according to claim 1, further comprising arranging the pixel data values in the first pixel group in a descending order for each of the sub-unit areas.

10. A median filtering method according to claim 1, wherein the first intermediate value comprises a median value of the pixel data values in the first pixel group.

11. A median filtering method according to claim 1, wherein determining the central pixel data value comprises replacing the current central pixel data value with the average value if the average value is different from the current central pixel data value.

12. A median filtering method according to claim 1, wherein determining the central pixel data value comprises utilizing the current central pixel data value if the current central pixel data value is equal to the average value.

* * * * *